United States Patent Office 2,805,218
Patented Sept. 3, 1957

2,805,218

2-AMINO-3-NITRO-5-ACYLTHIOPHENE AZO DYE COMPOUNDS

Edmund B. Towne, Melvin S. Bloom, and Joseph B. Dickey, Kingsport, Tenn., assignors to Eastman Kodak Company, Rochester, N. Y., a corporation of New Jersey No Drawing. Application April 5, 1954,
Serial No. 421,155

15 Claims. (Cl. 260—152)

This invention relates to new azo compounds prepared from 2-amino-3-nitro-5-acylthiophene compounds, the application of the new azo compounds to the art of dyeing or coloring and to certain of the 2-amino-3-nitro-5-acylthiophene compounds as new products.

We have discovered that the new azo compounds having the formula:

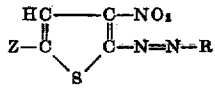

(I)

wherein Z represents an acetyl group, an n-propionyl group, an isobutyryl group, an n-butyryl group, a trifluoroacetyl group or a benzoyl group and R represents an aniline coupling component, a tetrahydroquinoline coupling component or a benzomorpholine coupling component are useful for coloring textile materials made of or containing a cellulose alkyl carboxylic acid ester having 2 to 4 carbon atoms in the acid groups thereof. These new azo compounds also color wool, silk, nylon and polyethylene terephthalate textile materials as well as fibers prepared from graft polymers obtained by graft polymerizing acrylonitrile alone or together with one or more other monoethylenic monomers with a preformed polymer. They are especially of use for the coloration of cellulose acetate textile materials.

It is an object of our invention to provide new azo compounds. Another object is to provide colored textile materials which have good fastness to light and gas, which discharge to a pure white, which have good wash fastness, good resistance to sublimation and which do not undergo a change in color toward red under artificial light. A further object is to provide new valuable dye intermediates. Still further objects are to provide satisfactory processes for the preparation of the new azo compounds and the new intermediate compounds of our invention.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new azo compounds of our invention are prepared by diazotizing a 2-amino-3-nitro-5-acylthiophene compound having the formula:

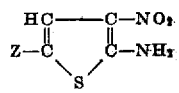

wherein Z represents an acetyl group, an n-propionyl group, an isobutyryl group, an n-butyryl group, a trifluoroacetyl group or a benzoyl group and coupling the diazonium compound obtained with an aniline, a tetrahydroquinoline or a benzomorpholine coupling component.

While our invention relates broadly to the new azo compounds having the formula numbered I, it relates more particularly to the azo compounds having the formulas:

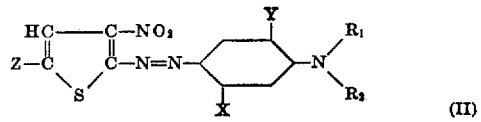

(II)

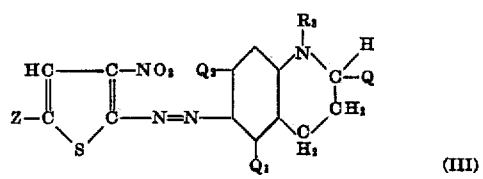

(III)

and

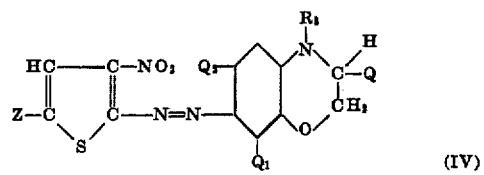

(IV)

wherein $R_1$ represents a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a β-acetoxyethyl group, a carbomethoxymethyl group, a carboethoxymethyl group, a β-carbomethoxyethyl group or a β-carboethoxyethyl group, $R_2$ represents an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a β-acetoxyethyl group, a carbomethoxymethyl group, a carboethoxymethyl group, a β-carbomethoxyethyl group, a β-carboethoxyethyl group, a β,β-difluoroethyl group, a β,β-difluoro-n-propyl group, a γ,γ-difluoropropyl group, a γ,γ-difluoro-n-butyl group, a δ,δ-difluoro-n-amyl group, a β,β,β-trifluoroethyl group, a γ,γ,γ-trifluoropropyl group or a δ,δ,δ-trifluorobutyl group, X represents a hydrogen atom, a bromine atom, a chlorine atom, a methyl group, an ethyl group, a methoxy group, an ethoxy group, an acetylamino group, an n-propionylamino group or an n-butyrylamino group, Y represents a hydrogen atom, a methyl group, an ethyl group, a methoxy group or an ethoxy group, Z represents an acetyl group, an n-propionyl group, an isobutyryl group, an n-butyryl group, a trifluoroacetyl group or a benzoyl group, $R_3$ represents a hydroxyalkyl group having 2 to 4, inclusive, carbon atoms, Q represents a hydrogen atom or a methyl group and $Q_1$ and $Q_2$ each represents a hydrogen atom, a methyl group, a methoxy group, a chlorine atom, a bromine atom, a fluorine atom, an acetylamino group, a propionylamino group or a butyrylamino group.

Illustrative of the alkyl groups represented by $R_1$ and $R_2$ are the methyl, the ethyl, the n-propyl, the isopropyl and the n-butyl groups. Similarly, the β-hydroxyethyl, the β-hydroxypropyl, the γ-hydroxypropyl, the β-γ-dihydroxypropyl, the β-methyl-β,γ-dihydroxypropyl and the γ-hydroxybutyl groups are illustrative of the hydroxyalkyl groups $R_1$ and $R_2$ represent. Illustrative of the alkoxyalkyl groups represented by $R_1$ and $R_2$ are the β-methoxyethyl and the β-ethoxyethyl groups. Similarly, the β-cyanoethyl, the γ-cyanopropyl and the δ-cyanobutyl group are illustrative of the cyanoalkyl groups $R_1$ and $R_2$ represent.

Typical of the aniline coupling components used in the preparation of the azo compounds of our invention are aniline, m-toluidine, m-anisidine, m-chloroaniline, 2-methoxy-5-chloroaniline, 2,5-dimethoxyaniline, 2-methoxy-5-methylaniline, N-β-hydroxyethylaniline, N-β-hydroxypropylaniline, N-β,γ-dihydroxypropylaniline, N-γ-hydroxypropylaniline, N-δ-hydroxybutylaniline, N-β-hydroxyethyl-o-chloroaniline, N-β-hydroxyethyl-o-methoxyaniline, N-β-cyanoethylaniline, N-β-methoxyethylaniline N-β-ethoxyethylaniline, N-β-carbomethoxyethyl-m-toluidine, N-β-carboethoxyethyl-m-chloroaniline, N,N-di-β-hydroxyethylaniline, N,N-di-β-hydroxyethyl-m-chloroaniline, N,N-di-β-hydroxyethyl-m-toluidine, N-ethyl-N-β,γ-dihydroxypropyl-m-toluidine, N-ethyl-N-(β-methyl-β,γ-dihydroxypropyl)aniline, N-butyl-N-(β-sodium sulfatoethyl)-m-toluidine, N-β-cyanoethyl-N-(β-sodium phosphatoethyl)-m-chloroaniline, N-methyl-N-β,γ-dihydroxypropyl-m-toluidine, N-β-methoxyethyl-N-β,γ-dihydroxypropyl-m-toluidine, N,N-di-β-hydroxyethyl-m-bromoaniline, N-ethyl-N-δ-hydroxybutylaniline, N-β-hydroxyethyl-N-β,β,β-trifluoroethylaniline, N-β-hydroxyethyl-N-γ,γ,γ-trifluoropropylaniline, N-β-hydroxyethyl-N-δ,δ,δ-trifluorobutylaniline, N-β-hydroxyethyl-N-β,β-difluoroethylaniline, N-β-hydroxypropyl-N-γ,γ-difluoropropylaniline, N-β-hydroxyethyl-N-β,β-difluoropropylaniline, N-β,γ-dihydroxypropyl-N-γ,γ-difluorobutylaniline, N-β,γ-dihydroxypropyl-N-δ,δ-difluoroamylaniline, N-methyl-N-β-hydroxyethyl-m-bromoaniline, N,N-di-β-hydroxyethyl-2,5-diethoxyaniline, N,N-di-β-hydroxyethyl-2,5-dichloroaniline, N-n-propyl-N-β-hydroxyethylaniline, N-isopropyl-N-β-hydroxyethylaniline, N-n-butyl-N-β-hydroxyethylaniline, N-β-hydroxyethyl-N-cyanoethyl-m-chloroaniline, N-β-hydroxyethyl-N-γ-cyano propylaniline, N-β-carbomethoxyethylaniline, N-β-carboethoxyethyl-N-β-hydroxyethylaniline, N-β-carbomethoxyethyl-N-β-hydroxyethyl-m-chloroaniline, N-β-hydroxyethyl-N-β-chlorallylaniline and N-β-hydroxy ethyl-N-β-nitroethylaniline.

Tetrahydroquinoline, 1-ethyltetrahydroquinoline, 1-β-hydroxyethyltetrahydroquinoline, 1-β,γ-dihydroxypropyltetrahydroquinoline, 1-β-methyl-β,γ-dihydroxypropyltetrahydroquinoline, 1-γ-hydroxypropyltetrahydroquinoline, 1-δ-hydroxybutyltetrahydroquinoline, 1-β-hydroxyethyl-2,7-dimethyltetrahydroquinoline, 1-β,γ-dihydroxypropyl-2,7-dimethyltetrahydroquinoline, 1-β,γ-dihydroxypropyl-2-methyltetrahydroquinoline, 1-β,γ-dihydroxypropyl-7-methyltetrahydroquinoline, 1-β,γ-dihydroxypropyl-7-chlorotetrahydroquinoline, 1-β,γ-dihydroxypropyl-7-bromotetrahydroquinoline, 1-β,γ-dihydroxypropyl-7-fluorotetrahydroquinoline, 1-β-hydroxyethyl-7-ethyltetrahydroquinoline, 1-β-hydroxyethyl-7-methoxytetrahydroquinoline, 1-β-methyl-β,γ-dihydroxypropyl-7-ethoxytetrahydroquinoline, 1-β-methoxyethyltetrahydroquinoline, 1-ethoxyethyltetrahydroquinoline, 1-β-cyanoethyltetrahydroquinoline, 1-β-carbomethoxyethyltetrahydroquinoline, 1-β-carboethoxyethyltetrahydroquinoline, 1-β,β,β-trifluoroethyltetrahydroquinoline, 1-δ,δ,δ-trifluorobutyltetrahydroquinoline, 1-β,β-difluoroethyltetrahydroquinoline, 1-γ,γ-difluoropropyltetrahydroquinoline, 1-β,β-difluoropropyltetrahydroquinoline, 1-δ,δ-difluoroamyltetrahydroquinoline, 1-β-hydroxypropyl-2,7-dimethyltetrahydroquinoline, 1-β-sulfatoethyltetrahydroquinoline, 1-β-phosphatoethyltetrahydroquinoline, 1-allyltetrahydroquinoline and 1-β-phosphonoethyltetrahydroquinoline are illustrative of the tetrahydroquinoline coupling components used in the preparation of the azo compounds of our invention.

Similarly, benzomorpholine, 1-ethylbenzomorpholine, 1-β-hydroxyethylbenzomorpholine, 1-β,γ-dihydroxypropylbenzomorpholine, 1-β-methyl-β,γ-dihydroxypropylbenzomorpholine, 1-γ-hydropropylbenzomorpholine, 1-δ-hydroxybutylbenzomorpholine, 1-β-hydroxyethyl-2,7-dimethylbenzomorpholine, 1-β,γ-dihydroxypropyl-2,7-dimethylbenzomorpholine, 1-β,γ-dihydroxypropyl-2-methylbenzomorpholine, 1-β,γ-dihydroxypropyl-7-methylbenzomorpholine, 1-β,γ-dihydroxypropyl-7-chlorobenzomorpholine, 1-β,γ-dihydroxypropyl-7-bromobenzomorpholine, 1-β,γ-dihydroxypropyl-7-fluorobenzomorpholine, 1-β-hydroxyethyl-7-ethylbenzomorpholine, 1-β-hydroxyethyl-7-methoxybenzomorpholine, 1-β-methyl-β,γ-dihydroxypropyl-7-ethoxybenzomorpholine, 1-β-methoxyethylbenzomorpholine, 1-ethoxyethylbenzomorpholine, 1-β-cyanoethylbenzomorpholine, 1-β-carbomethoxyethylbenzomorpholine, 1-β-carboethoxyethylbenzomorpholine, 1,β,β,β-trifluoroethylbenzomorpholine, 1-δ,δ,δ-trifluorobutylbenzomorpholine, 1-β,β-difluoroethylbenzomorpholine, 1-γ,γ-difluoropropylbenzomorpholine, 1-β,β-difluoropropylbenzomorpholine, 1-δ,δ-difluoroamylbenzomorpholine, 1-β-hydroxypropyl-2,7-dimethylbenzomorpholine, 1-β-sulfatoethylbenzomorpholine, 1-β-phosphatoethylbenzomorpholine, 1-allylbenzomorpholine and 1-β-phosphonethylbenzomorpholine are illustrative of the benzomorpholine coupling compounds used in the preparation of the azo compounds of our invention.

The following examples illustrate the compounds of our invention and their manner of preparation.

EXAMPLE 1

A. Preparation of nitrosyl sulfuric acid 1.52 grams of sodium nitrite were added portionwise, with vigorous stirring, to 10 cc. of concentrated sulfuric acid (95–96%) and the temperature of the reaction mixture was allowed to rise to 65° C. The resulting solution was then cooled to 5° C. and 20 cc. of a mixture of 3 cc. of n-propionic and 17 cc. of acetic acid were added dropwise, with stirring, while allowing the temperature to rise to 15° C. and maintaining it at this temperature during the remainder of the addition.

B. Diazotization

The nitrosyl sulfuric acid mixture prepared as described above was cooled to 0° C.–5° C. and then 3.72 grams of 2-amino-3-nitro-5-acetylthiophene were added portionwise, while stirring, after which 20 cc. more of the n-propionic-acetic acid mixture described above were added while keeping the temperature of the reaction mixture at 0° C.–5° C. The reaction mixture thus obtained was then stirred at 0° C.–5° C. for 2 hours and any excess sodium nitrite present in the mixture was destroyed by adding 1 gram of urea. A clear diazonium solution was obtained.

C. Coupling 10 cc. of the 2-amino-3-nitro-5-acetylthiophene diazonium solution prepared as described in B above were added, with stirring, at 0 C.–5° C. to a solution of 0.84 gram of N-ethyl-N-β,γ-dihydroxypropyl-m-toluidine in 7 cc. of 10% sulfuric acid. The coupling reaction which takes place was allowed to proceed for 15 minutes and then the reaction mixture was drowned in 200 cc. of water with stirring. After the drowned dye compound had stood for about 1 hour, it was recovered by filtration, washed with water until neutral and then dried. 1.14 grams of a type compound having the formula:

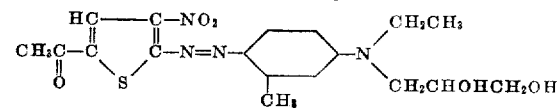

was recovered as a dark powder. It dyes cellulose acetate wool, nylon and polyethylene terephthalate textile materials greenish blue shades. The dyeings on cellulose acetate have good fastness to light and excellent fastness to gas and do not change in color toward the red under artificial light. Additionally, the dyeings on cellulose acetate give sharp, white discharge prints.

EXAMPLE 2

A solution of 0.78 gram of N,N-di-β-hydroxyethyl-m-toluidine in 7 cc. of 10% sulfuric acid was coupled with 10 cc. of the 2-amino-3-nitro-5-acetylthiophene diazonium solution prepared as described in Example 1. Coupling and recovery of the dye compound formed were carried out in accordance with the procedure described in Example 1. 1.15 grams of a dye compound that colors cellulose acetate textile materials greenish-blue shades which show no change to red under artificial light were obtained. This dye compound likewise dyes wool, silk, nylon and polyethylene terephthalate materials greenish-blue shades.

EXAMPLE 3

A solution of 0.93 gram of N,N-di-β-hydroxyethyl-m-acetylaminoaniline in 7 cc. of 10% sulfuric acid was coupled with 10 cc. of the 2-amino-3-nitro-5-acetylthiophene diazonium solution prepared in Example 1. Coupling and recovery of the dye compound formed were carried out in accordance with the procedure described in Example 1. 1.31 grams of a dye compound which colors cellulose acetate textile materials greenish-blue shades which show no change in color toward red under artificial light were thus obtained.

EXAMPLE 4

A solution of 0.86 gram of N,N-di-β-hydroxyethyl-m-chloroaniline in 7 cc. of 10% sulfuric acid was coupled with 10 cc. of the 2-amino-3-nitro-5-acetylthiophene diazonium solution prepared in Example 1. Coupling and recovery of the dye compound formed were carried out in accordance with the procedure described in Example 1. An excellent yield of a dye compound which colors cellulose acetate textile materials deep reddish-blue shades which have good fastness to light and excellent fastness to gas was thus obtained.

EXAMPLE 5

A solution of 1.09 grams of N-β,γ-dihydroxypropyl-N-γ,γ-difluorobutyl-m-toluidine in 7 cc. of 10% sulfuric acid was coupled with 10 cc. of the 2-amino-3-nitro-5-acetylthiophene diazonium solution prepared in Example 1. Coupling and recovery of the dye compound formed were carried out in accordance with the procedure described in Example 1. 1.54 grams of a dye compound that colors cellulose acetate textile materials bright deep blue shades were thus obtained. The dye has excellent affinity for cellulose acetate and yields dyeings thereon which discharge to a pure white and which undergo no change in color toward red under artificial light.

EXAMPLE 6

A solution of 0.94 gram of 1-β-,γ-dihydroxypropyl-2,7-dimethyltetrahydroquinoline in 7 cc. of 10% sulfuric acid was coupled with 10 cc. of a 2-amino-3-nitro-5-acetylthiophene diazonium solution prepared as described in Example 1. Coupling and recovery of the dye compound formed were carried out in accordance with the procedure described in Example 1. 1.25 grams of a dye compound having the formula:

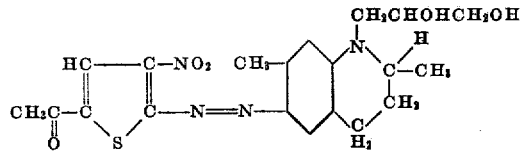

were obtained as a blue-black powder. This dye compound colors cellulose acetate, wool, nylon and polyethylene terephthalate textile materials brilliant bluish-green shades. The dyeings undergo no shift in color toward red when exposed to artificial light, have good fastness to light and gas and give sharp white discharge prints.

EXAMPLE 7

5.86 grams of 2-amino-3-nitro-5-(3'-nitrobenzoyl)-thiophene were diazotized with nitrosyl sulfuric acid in propionic-acetic acid in accordance with the procedure described in Example 1A. That is, Example 1A was repeated using 5.86 grams of 2-amino-3-nitro-5-benzoylthiophene in place of 3.72 grams of 2-amino-3-nitro-5-acetylthiophene.

A solution of 0.42 gram of N-ethyl-N-β,γ-dihydroxypropyl-m-toluidine in about 4 cc. of 10% sulfuric acid was coupled with 5 cc. of the 2-amino-3-nitro-5-(3'-nitrobenzoyl)-thiophene diazonium solution prepared as described above. Coupling and recovery of the dye compound formed were carried out in accordance with the procedure described in Example 1. A good yield of a dye compound which dyes cellulose acetate textile materials deep brilliant bluish-green shades that are considerably greener than the dye obtained in Example 1 were thus obtained. This dye compound also dyes wool, nylon and polyethylene terephthalate textile materials bluish-green shades. The dyeings obtained have good fastness to light, excellent fastness to gas and give sharp white discharge prints. The dye compound has excellent affinity for cellulose acetate textile materials and does not sublime.

EXAMPLE 8

A solution of 0.47 grams of 1-β,γ-dihydroxypropyl-2,7-dimethyltetrahydroquinoline in about 4 cc. of 10% sulfuric acid was coupled with 5 cc. of the 2-amino-3-nitro-5-(3'-nitrobenzoyl)-thiophene diazonium solution prepared in Example 7. Coupling and recovery of the dye compound formed were carried out in accordance with the procedure described in Example 1. The dye compound thus obtained colors cellulose acetate textile materials bluish-green shades having good fastness to light and excellent fastness to gas. Further, the dyeings on cellulose acetate have excellent discharge properties and do not undergo a change in color toward red under artificial light.

EXAMPLE 9

2.93 grams of 2-amino-3-nitro-5-(3'-nitrobenzoyl)-thiophene were diazotized and the diazonium compound obtained was coupled with 2.37 grams of 1-β,γ-dihydroxypropyl-2,7-dimethyl-benzomorpholine. Diazotization, coupling and recovery of the dye compound formed were carried out in accordance with the general procedure described in Example 1. The dye compound obtained colors cellulose acetate textile materials bluish-green shades.

EXAMPLE 10

2.93 grams of 2-amino-3-nitro-5-(3'-nitrobenzoyl)-thiophene were diazotized and the diazonium compound obtained was coupled with 2.01 grams of N-β,β-difluoroethyl-N-β-hydroxyethylaniline. Diazotization, coupling and recovery of the dye compound formed were carried out in accordance with the general procedure described in Example 1. The dye compound obtained colors cellulose acetate textile materials blue shades.

EXAMPLE 11

2.0 grams of 2-amino-3-nitro-5-n-propionylthiophene were diazotized and the diazonium compound obtained was coupled with 2.32 grams of N-β-cyanoethyl-N-β-carbomethoxyethylaniline. Diazotization, coupling and recovery of the dye compound formed were carried out in accordance with the general procedure described in Example 1. The dye compound obtained colors cellulose acetate textile materials blue shades.

EXAMPLE 12

2.14 grams of 2-amino-3-nitro-5-isobutyrylthiophene were diazotized and the diazonium compound obtained was coupled with 2.46 grams of N,N-di(β-hydroxyethyl)-2-methoxy-5-chloroaniline. Diazotization, coupling and recovery of the dye compound formed were carried out in accordance with the general procedure described in Example 1. The dye compound obtained colors cellulose acetate textile materials greenish-blue shades.

EXAMPLE 13

2.14 grams of 2-amino-3-nitro-5-n-butyrylthiophene were diazotized and the diazonium compound obtained was coupled with 1.95 grams of N,N-di-(β-hydroxyethyl)-m-toluidine. Diazotization, coupling and recovery of the dye compound formed were carried out in accordance with the general procedure described in Example 1. The dye compound obtained colors cellulose acetate textile materials greenish-blue shades.

EXAMPLE 14

2.40 grams of 2-amino-3-nitro-5-trifluoroacetylthiophene were diazotized and the diazonium compound obtained was coupled with 1.94 grams of N-ethyl-N-$\beta,\gamma$-dihydroxypropyl-m-toluidine. Diazotization, coupling and recovery of the dye compound formed were carried out in accordance with the general procedure described in Example 1. The dye compound obtained colors cellulose acetate textile materials violet-blue shades.

EXAMPLE 15

2.93 grams of 2-amino-3-nitro-5-(3'-nitrobenzoyl)-thiophene were diazotized and the diazonium compound obtained was coupled with 1.9 grams of N-$\beta$-cyanoethyl-N-$\beta$-hydroxyethylaniline. Diazotization, coupling and recovery of the dye compound formed were carried out in accordance with the general procedure described in Example 1. The dye compound obtained colors cellulose acetate textile materials blue shades.

EXAMPLE 16

3.27 grams of 2-amino-3-nitro-5-(5'-nitro-2'-chlorobenzoyl)-thiophene were diazotized and the diazonium compound obtained was coupled with 2.65 grams of N,N-di($\beta$-carbomethoxyethyl)aniline. Diazotization, coupling and recovery of the dye compound formed were carried out in accordance with the general procedure described in Example 1. The dye compound obtained colors cellulose acetate textile materials blue shades.

EXAMPLE 17

3.63 grams of 2-amino-3-nitro-5-(5'-nitro-2',4'-dichlorobenzoyl)-thiophene were diazotized and the diazonium compound obtained was coupled with 2.16 grams of N,N-di($\beta$-hydroxyethyl)-m-chloroaniline. Diazotization, coupling and recovery of the dye compound formed were carried out in accordance with the general procedure described in Example 1. The dye compound obtained colors cellulose acetate textile materials blue shades.

EXAMPLE 18

3.23 grams of 2-amino-3-nitro-5-(5'-nitro-2'-methoxybenzoyl)-thiophene were diazotized and the diazonium compound obtained was coupled with 1.81 grams of N,N-di($\beta$-hydroxyethyl)-aniline. Diazotization, coupling and recovery of the dye compound formed were carried out in accordance with the general procedure described in Example 1. The dye compound obtained colors cellulose acetate textile materials bluish-green shades.

EXAMPLE 19

3.18 grams of 2-amino-3-nitro-5-(3',4'-dichlorobenzoyl)-thiophene were diazotized and the diazonium compound obtained was coupled with 2.37 grams of 1-$\beta,\gamma$-dihydroxypropyl-2,7-dimethyl-benzomorpholine. Diazotization, coupling and recovery of the dye compound formed were carried out in accordance with the general procedure described in Example 1. The dye compound obtained colors cellulose acetate textile materials bluish-green shades.

EXAMPLE 20

1.86 grams of 2-amino-3-nitro-5-acetylthiophene were diazotized and the diazonium compound obtained was coupled with 2.23 grams of 1-$\beta,\gamma$-dihydroxypropyl-2-methylbenzomorpholine. Diazotization, coupling and recovery of the dye compound formed were carried out in accordance with the general procedure described in Example 1. The dye compound obtained colors cellulose acetate textile materials blue shades.

EXAMPLE 21

2.0 grams of 2-amino-3-nitro-5-n-propionylthiophene were diazotized and the diazonium compound obtained was coupled with 2.49 grams of 1-($\beta$-methyl-$\beta,\gamma$-dihydroxypropyl)-2,7-dimethyltetrahydroquinoline. Diazotization, coupling and recovery of the dye compound formed were carried out in accordance with the general procedure described in Example 1. The dye compound obtained colors cellulose acetate textile materials blue-green shades.

EXAMPLE 22

2.14 grams of 2-amino-3-nitro-5-isobutyrylthiophene were diazotized and the diazonium compound obtained was coupled with 2.56 grams of 1-$\beta,\gamma$-dihydroxypropyl-2-methyl-7-chlorotetrahydroquinoline. Diazotization, coupling and recovery of the dye compound formed were carried out in accordance with the general procedure described in Example 1. The dye compound obtained colors cellulose acetate textile materials blue shades.

EXAMPLE 23

2.14 grams of 2-amino-3-nitro-5-n-butyrylthiophene were diazotized and the diazonium compound obtained was coupled with 2.07 grams of 1-$\beta,\gamma$-dihydroxypropyltetrahydroquinoline. Diazotization, coupling and recovery of the dye compound formed were carried out in accordance with the general procedure described in Example 1. The dye compound obtained colors cellulose acetate textile materials blue shades.

EXAMPLE 24

2.4 grams of 2-amino-3-nitro-5-trifluoroacetylthiophene were diazotized and the diazonium compound obtained was coupled with 2.09 grams of 1-$\beta,\gamma$-dihydroxypropylbenzomorpholine. Diazotization, coupling and recovery of the dye compound formed were carried out in accordance with the general procedure described in Example 1. The dye compound obtained colors cellulose acetate textile materials blue shades.

EXAMPLE 25

2.93 grams of 2-amino-3-nitro-5-(3'-nitrobenzoyl)-thiophene were diazotized and the diazonium compound obtained was coupled with 1.97 grams of 1-$\beta,\beta$-difluoroethyltetrahydroquinoline. Diazotization, coupling and recovery of the dye compound formed were carried out in accordance with the general procedure described in Example 1. The dye compound obtained colors cellulose acetate textile materials blue shades.

EXAMPLE 26

3,27 grams of 2-amino-3-nitro-5-(5'-nitro-2'-chlorobenzoyl)-thiophene were diazotized and the diazonium compound obtained was coupled with 2.15 grams of 1-$\beta$,$\beta,\beta$-trifluoroethyltetrahydroquinoline. Diazotization, coupling and recovery of the dye compound formed were carried out in accordance with the general procedure described in Example 1. The dye compound obtained colors cellulose acetate textile materials blue shades.

EXAMPLE 27

3.63 grams of 2-amino-3-nitro-5-(5'-nitro-2',4'-dichlorobenzoyl)-thiophene were diazotized and the diazonium compound obtained was coupled with 1.37 grams of N-$\beta$-hydroxyethylaniline. Diazotization, coupling and recovery of the dye compound obtained were carried out in accordance with the general procedure described in Example 1. The dye compound obtained colors cellulose acetate textile materials blue shades.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure indicated hereinbefore.

| Amine | Coupling Component | Color |
|---|---|---|
| 2 - amino - 3 - nitro - 5 - acetylthiophene. | (1) N-ethyl-N-β,γ-dihydroxy-propyl-m-ethylaniline. | green-blue. |
| Do. | (2) N,N-di-β-hydroxyethyl-m-ethylaniline. | Do. |
| Do. | (3) aniline. | blue. |
| Do. | (4) m-anisidine. | Do. |
| Do. | (5) N-β-hydroxyethyl-o-chloroaniline. | Do. |
| Do. | (6) N-n-butyl-N-(β-sodium sulfatoethyl)-m-toluidine. | Do. |
| Do. | (7) N-β-methoxyethyl-N-β,γ-dihydroxypropyl-m-toluidine. | green-blue. |
| Do. | (8) N-ethyl-N-δ-hydroxybutylaniline. | Do. |
| Do. | (9) N-β-hydroxyethyl-γ,γ,γ-trifluoropropylaniline. | violet-blue. |
| Do. | (10) N-β-hydroxypropyl-N-γ,γ-difluoropropylaniline. | Do. |
| Do. | (11) N-β,γ-dihydroxypropyl-N-δ,δ-difluoroamylaniline. | blue. |
| Do. | (12) N,N-di-β-hydroxyethyl-2,5-dichloroaniline. | Do. |
| Do. | (13) N-β-hydroxyethyl-N-γ-cyanopropylaniline. | Do. |
| Do. | (14) N-β-hydroxyethyl-N-β-chlorallylaniline. | Do. |
| Do. | (15) tetrahydroquinoline. | Do. |
| Do. | (16) 1-β-hydroxyethyltetrahydroquinoline. | Do. |
| Do. | (17) 1-δ-hydroxybutyltetrahydroquinoline. | Do. |
| Do. | (18) 1-β,γ-dihydroxypropyl-2-methyltetrahydroquinoline. | Do. |
| Do. | (19) 1-β-hydroxyethyl-7-methoxytetrahydroquinoline. | blue-green. |
| Do. | (20) 1-β-cyanoethyltetrahydroquinoline. | green. |
| Do. | (21) 1-β,β,β-trifluoroethyltetrahydroquinoline. | violet-blue. |
| Do. | (22) 1-β,β-difluoroethyltetrahydroquinoline. | Do. |
| Do. | (23) 1-δ,δ-difluoroamyltetrahydroquinoline. | blue. |
| Do. | (24) 1-β-phosphatoethyltetrahydroquinoline. | Do. |
| Do. | (25) 1-β-phosphonoethyltetrahydroquinoline. | Do. |
| Do. | (26) 1-ethylbenzomorpholine. | Do. |
| Do. | (27) 1-β,γ-dihydroxypropylbenzomorpholine. | Do. |
| Do. | (28) 1-β,γ-dihydroxypropyl-7-chlorobenzomorpholine. | Do. |
| Do. | (29) 1-β-carboethoxyethylbenzomorpholine. | Do. |
| Do. | (30) 1-δ,δ,δ-trifluorobutylbenzomorpholine. | violet-blue. |
| Do. | (31) 1-δ,δ-difluoroamylbenzomorpholine. | blue. |
| Do. | (32) 1-β-phosphatoethylbenzomorpholine. | Do. |
| Do. | (33) 1-β-phosphonoethylbenzomorpholine. | Do. |
| 2 - amino - 3 - nitro - 5 - n - propionylthiophene. | (34) m-toluidine. | Do. |
| Do. | (35) N-β-cyanoethyl-N-(β-sodium phosphatoethyl)-m-chloroaniline. | violet. |
| Do. | (36) N-β-hydroxyethyl-N-β,β-difluoroethylaniline. | Do. |
| Do. | (37) N-n-butyl-N-β-hydroxyethylaniline. | green-blue. |
| Do. | (38) 1-ethyltetrahydroquinoline. | blue. |
| Do. | (39) 1-β,γ-dihydroxypropyl-7-chlorotetrahydroquinoline. | Do. |
| Do. | (40) 1-δ,δ,δ-trifluorobutyltetrahydroquinoline. | violet-blue. |
| Do. | (41) 1-allyltetrahydroquinoline. | blue. |
| Do. | (42) 1-δ-hydroxybutylbenzomorpholine. | violet-blue. |
| Do. | (43) 1-β,β-difluoropropylbenzomorpholine. | Do. |
| 2 - amino - 3 - nitro - 5 - iso-butyrylthiophene. | (44) 2,5-dimethoxyaniline. | blue. |
| Do. | (45) N,N-di-β-hydroxyethyl-m-bromoaniline. | Do. |
| Do. | (46) N-β,γ-dihydroxypropyl-N-γ,γ-difluorobutylaniline. | violet-blue. |
| Do. | (47) N-β-carboethoxyethyl-N-β-hydroxyethylaniline. | blue. |
| Do. | (48) 1-β,γ-dihydroxypropyltetrahydroquinoline. | Do. |
| Do. | (49) 1-β-methoxyethyltetrahydroquinoline. | Do. |
| Do. | (50) 1-β,β-difluoropropyltetrahydroquinoline. | violet-blue. |
| Do. | (51) benzomorpholine. | blue. |
| Do. | (52) 1-β-ethoxyethylbenzomorpholine. | Do. |
| Do. | (53) 1-β-sulfatoethylbenzomorpholine. | Do. |
| 2 - amino - 3 - nitro - 5 - n - butyrylthiophene. | (54) N-ethyl-N-β,γ-dihydroxypropyl-m-toluidine. | green-blue. |
| Do. | (55) N-β-hydroxyethyl-N-β,β,β-trifluoroethylaniline. | violet-blue. |
| Do. | (56) N,N-di-β-hydroxyethyl-2,5-diethoxyaniline. | green-blue. |
| Do. | (57) N-β-hydroxyethyl-N-β-nitroethylaniline. | blue. |
| Do. | (58) 1-β,γ-dihydroxypropyl-2,7-dimethyltetrahydroquinoline. | blue-green. |
| Do. | (59) 1-β-carbomethoxyethyltetrahydroquinoline. | blue. |
| Do. | (60) 1-β-sulfatoethyltetrahydroquinoline. | Do. |
| Do. | (61) 1-β-hydroxyethylbenzomorpholine. | Do. |
| Do. | (62) 1-β,β,β-trifluoroethylbenzomorpholine. | violet-blue. |
| Do. | (63) 1-allylbenzomorpholine. | blue. |
| 2-amino-3-nitro-5-(3'-nitrobenzoyl)-thiophene. | (64) N-n-butyl-N-β,γ-dihydroxypropyl-m-toluidine. | blue-green. |
| Do. | (65) N-n-propyl-N-β,γ-dihydroxypropyl-m-toluidine. | Do. |
| Do. | (66) N-methyl-N-β,γ-dihydroxypropylaniline. | Do. |
| Do. | (67) N-n-butyl-N-β-hydroxyethylaniline. | Do. |
| Do. | (68) N-methyl-N-β-hydroxyethylaniline. | Do. |
| Do. | (69) N,N-di-β-hydroxyethyl-2-methoxy-5-chloroaniline. | Do. |
| Do. | (70) N-β,γ-dihydroxypropyl-2-ethoxy-5-acetylaminoaniline. | Do. |
| Do. | (71) N-γ,γ-difluoropropyl-N-β-hydroxyethylaniline. | blue. |
| Do. | (72) 1-β,γ-dihydroxypropyl-2,4,7-trimethyltetrahydroquinoline. | blue-green. |
| Do. | (73) 1-β-hydroxyethyl-2,5-dimethylbenzomorpholine. | Do. |
| 2-amino-3-nitro-5-trifluoroacetylthiophene. | (74) N-methyl-N-β,γ-dihydroxypropyl-m-toluidine. | green-blue. |
| Do. | (75) N-ethyl-N-β-hydroxyethylaniline. | Do. |
| Do. | (76) N-n-butyl-N-β,γ-dihydroxypropylaniline. | Do. |
| Do. | (77) 1-β,γ-dihydroxypropyl-7-methyltetrahydroquinoline. | Do. |
| Do. | (78) 1-β-hydroxyethyl-2,5-dimethylbenzomorpholine. | Do. |
| 2-amino-3-nitro-5-(5'-nitro-2'-chlorobenzoyl)-thiophene. | (79) N-ethyl-N-β-hydroxyethyl-m-toluidine. | blue-green. |
| Do. | (80) N-ethyl-N-β,γ-dihydroxypropylaniline. | Do. |
| Do. | (81) N,N-di-β-hydroxyethyl-2-ethoxy-5-acetylaminoaniline. | Do. |
| Do. | (82) 1-β,γ-dihydroxypropyl-2,7-dimethyltetrahydroquinoline. | Do. |
| Do. | (83) 1-β,γ-dihydroxypropyl-2,7-dimethylbenzomorpholine. | Do. |
| 2-amino-3-nitro-5-(5'-nitro-2',4'-dichlorobenzoyl)-thiophene. | (84) N-ethyl-N-β-hydroxyethylaniline. | Do. |
| Do. | (85) N-n-butyl-N-β-hydroxyethyl-m-toluidine. | Do. |
| Do. | (86) N-n-butyl-N-β-hydroxyethyl-m-acetylaminoaniline. | Do. |
| Do. | (87) N-β,β-difluoroethyl-N-β-hydroxyethyl-m-toluidine. | blue. |

| Amine | Coupling Component | Color |
|---|---|---|
| 2-amino-3-nitro-5-(5'-nitro-2',4'-dichlorobenzoyl)-thiophene. | (88) 1-β-hydroxyethyl-2,7-dimethyltetrahydroquinoline. | blue-green. |
| Do | (89) 1-β,γ-dihydroxypropyl-2,5-dimethylbenzomorpholine. | Do. |
| 2-amino-3-nitro-5-(5'-nitro-2'-methoxybenzoyl)-thiophene. | (90) N-methyl-N-β-hydroxyethyl-m-toluidine. | Do. |
| Do | (91) N-ethyl-N-β-hydroxyethylaniline. | Do. |
| Do | (92) N-n-butyl-N-β,γ-dihydroxypropyl-m-acetylaminoaniline. | Do. |
| Do | (93) N,N-di-β-hydroxypropyl-m-chloroaniline. | blue. |
| Do | (94) N-β-carbomethoxyethyl-N-β-hydroxyethylaniline. | green-blue. |
| Do | (95) 1-β,γ-dihydroxypropyl-2-methyl-5-acetylaminotetrahydroquinoline. | blue-green. |
| Do | (96) 1-β-hydroxyethyl-2,5-dimethylbenzomorpholine. | Do. |
| 2-amino-3-nitro-5-(3',4'-dichlorobenzoyl)-thiophene. | (97) N-ethyl-N-β-hydroxyethylaniline. | Do. |
| Do | (98) N-n-propyl-N-β,γ-dihydroxypropylaniline. | Do. |
| Do | (99) N,N-di-β-hydroxypropyl-m-toluidine. | Do. |
| Do | (100) N,N-di-β-hydroxyethyl-2,5-dimethoxyaniline. | Do. |
| Do | (101) N-γ-hydroxypropyl-N-ethyl-m-bromoaniline. | green-blue. |
| Do | (102) N-β-cyanoethyl-N-β,γ-dihydroxypropyl-m-toluidine. | Do. |
| Do | (103) N-β-hydroxyethyl-N-δ-cyanobutylaniline. | Do. |
| Do | (104) N-β,β,β-trifluoroethyl-N-β-hydroxyethyl-m-toluidine. | blue. |
| Do | (105) 1-β,γ-dihydroxypropyl-2,7-dimethyltetrahydroquinoline. | blue-green. |
| Do | (106) 1-β-hydroxypropyl-2,5-dimethylbenzomorpholine. | Do. |

While our new azo compounds have been described more particularly in connection with the dyeing or coloring of cellulose acetate textile materials it is to be understood that they color the other textile materials similar shades. Inso far as azo compounds are concerned our invention is particularly directed to azo compounds not containing a sulfonic acid group. The azo compounds of our invention yield dyeings which have a remarkable shift in color toward blue.

In order that our invention may be entirely clear the preparation of various thiophene compounds is described hereinafter

2-chloro-5-isobutyrylthiophene

A solution of 178 grams of 2-chlorothiophene and 160 grams of isobutyryl chloride in 1.5 liters of dry benzene was stirred at 0° C. in a 3-liter, 3-necked flask fitted with CaCl₂ tubes. 392 grams of stannic chloride were added dropwise, with stirring, during 40 minutes to the above solution at 0–2° C., a purple complex separating during the addition. The cooling bath was then removed and stirring was continued for 1.5 hours at room temperature. Then the complex was hydrolyzed by the dropwise addition of 75 cc. of concentrated HCl in 675 cc. of water.

After standing overnight, the benzene solution was washed with water, dilute aqueous NaHCO₃ solution and then water again. The benzene was then distilled off and the residue was steam distilled to yield an oil which was dried over Drierite (anhydrous calcium sulfate). Rectification yielded 205.5 grams (72.7%) of 2-chloro-5-isobutyrylthiophene, B. P. 100–2° C./3 mm.

2-chloro-3-nitro-5-isobutyrylthiophene 47.1 grams of 2-chloro-5-isobutyrylthiophene in a flask were cooled in an ice bath to 5° C. and a cooled nitrating mixture of 25 cc. of H₂SO₄ and 22.1 grams of fuming HNO₃ (sp. gr. 1.5) were added with stirring at such a rate as to keep the temperature at 5° C. After the addition was complete, the reaction mixture was drowned on ice and the low melting solid which separated was extracted with benzene. The benzene solution was washed with water, dilute aqueous NaHCO₃ solution and then water again and dried over Na₂SO₄.

The benzene was distilled off and the crystalline, slightly oily residue was slurred with petroleum ether and filtered to yield 2-chloro-3-nitro-5-isobutyrylthiophene as a yellow crystalline solid having a melting point of 61° C.–63° C. in a 60% yield.

2-amino-3-nitro-5-isobutyrylthiophene

A solution of 23.4 grams of 2-chloro-3-nitro-5-isobutyrylthiophene and 85 cc. of NH₄OH in 600 cc. of methyl alcohol was refluxed on a steam bath for 1 hour. Most of the methyl alcohol was removed by distillation following which the reaction mixture was cooled and filtered to obtain 11.45 grams of crude product having a melting point of 166° C.–168° C. on the filter. An additional 77 grams of crude product having a melting point of 150° C.–157° C. was obtained on drowning the methyl alcohol filtrate in water. Recrystallization of the crude reaction product from dilute methyl alcohol yielded 2-amino-3-nitro-5-isobutyrylthiophene having a melting point of 168° C.–171° C.

2-chloro-5-acetylthiophene

A solution of 50 grams of 2-chlorothiophene and 33 grams of acetyl chloride in 300 cc. of n-hexane was treated portionwise with 56 grams of AlCl₃ at 40° C. during 40 minutes. The reaction was not very vigorous and a purple complex separated. The reaction mixture was stirred for 1 hour more and then the n-hexane was removed by decantation. The dark residue remaining after decantation was decomposed by adding ice following which the reaction mixture was steam distilled to yield 48 grams of crude 2-chloro-5-acetylthiophene as a white low melting solid. Upon twice washing the crude reaction product with cold n-pentane 36 grams (56%) of 2-chloro-5-acetylthiophene melting at 44° C.–46° C. remained.

2-chloro-3-nitro-5-acetylthiophene

A mixture of 52 grams of fuming HNO₃ and 150 cc. of H₂SO₄ (95%) cooled to 0° C. was treated portionwise with stirring during 1 hour with 100 grams of 2-chloro-5-acetylthiophene. The reaction mixture thus obtained was stirred for 1 hour more at 10° C.–20° C. and then poured onto ice. The yellow-buff precipitate was recovered by filtration, washed with water until neutral and dried. 124 grams (97%) of crude 2-chloro-3-nitro-5-acetylthiophene having a melting point of 67° C.–75° C. were thus obtained. Upon crystallization twice from cyclohexane 80.5 grams of 2-chloro-3-nitro-5- acetylthiophene having a melting point of 68° C.–81° C. were obtained in the form of yellow needles. Recrystallization of the reaction product from ethyl alcohol gave a purified reaction product melting at 75° C.–84° C.

2-amino-3-nitro-5-acetylthiophene

A solution of 14.5 grams of 2-chloro-3-nitro-5-acetylthiophene and 55 cc. of NH₄OH in 300 cc. of methyl alcohol was refluxed for 1 hour. The reaction mixture was then cooled following which it was filtered to obtain 6.5 grams of reaction product as a purplish precipitate. Concentration of the mother liquors yielded 1.3 grams more of crude reaction product. The combined purplish products had a melting point of 224° C.–227° C. Upon twice recrystallizing the crude reaction product from acetic acid 2-chloro-3-nitro-5-acetylthiophene was recovered as a brown-yellow solid melting at 227° C.–228° C.

Calculated for 2 - amino - 3 - nitro - 5 - acetylthiophene: C=38.71; H=3.23; N=15.05; S=17.20. Found: C=38.83; H=3.23; N=14.53; S=16.94.

2-amino-3-nitro-5-n-propionylthiophene

This compound is prepared by starting with 138.7 grams of n-propionyl chloride and 178 grams of 2-chlorothiophene and proceeding in accordance with the general procedure described in connection with the preparation of 2-amino-3-nitro-5-isobutyryl thiophene.

2-chloro-5-trifluoroacetylthiophene

In a 1-liter, 3-necked flask fitted with a stirrer, gas inlet tube and a Dry Ice-acetone cooling bath were placed 53.5 grams of 2-chlorothiophene and 350 cc. of petroleum ether. 132.5 grams of trifluoroacetyl chloride were added with stirring at —45° C. to —55° C. over a period of 1.5 hours. The trifluoroacetyl chloride was prepared by heating 210 grams of benzoyl chloride with 114 grams of trifluoroacetic acid.

The temperature of the reaction mixture was raised to —35° C. and then 48 grams of anhydrous aluminum chloride was added with stirring over a period of 5 minutes. The temperature of the reaction mixture was then allowed to rise to 20° C., while stirring, during 3 hours and was maintained at this temperature for another 3 hours while stirring. The reaction mixture thus obtained was poured onto ice. The organic layer which separated was recovered and washed successively with water, saturated aqueous sodium bicarbonate solution and water. After drying the solution, the solvent present was removed by distillation at atmospheric pressure following which the residue was distilled under reduced pressure. 28 grams of 2-chloro-5-trifluoroacetylthiophene boiling at 75° C.–79° C./14 mm. were obtained. Upon redistillation under reduced pressure the reaction product boiled at 80° C.–86° C./21 mm., $n_D^{20}$ 1.5088.

Calculated for 2 - chloro - 5 - trifluoracetylthiophene: C=33.58; H=0.94; F=26.56. Found: C=36.48; H=1.77; F=22.39.

2-chloro-3-nitro-5-trifluoroacetylthiophene

The 2-chloro-5-trifluoroacetylthiophene obtained as described above was nitrated in accordance with the procedure described in connection with the preparation of 2-chloro-3-nitro-5-acetylthiophene to obtain 2-chloro-3-nitro-5-trifluoroacetylthiophene.

2-amino-3-nitro-5-trifluoroacetylthiophene

This compound was obtained by aminating 2-chloro-3-nitro-5-trifluoroacetylthiophene with NH₄OH in methyl alcohol using the procedure described in connection with the preparation of 2-amino-3-nitro-5-acetylthiophene.

2-chloro-5-benzoylthiophene

A suspension of 56 grams of AlCl₃ in 250 cc. of n-hexane was treated, with stirring, with 50 grams of 2-chlorothiophene and 60 grams of benzoyl chloride in 100 cc. of n-hexane at 10° C. A yellow solid formed and stirring was continued for 30 minutes longer at 10° C. after the addition and then for 3 hours at room temperature. After standing overnight, the reaction mixture was poured into iced dilute HCl. The n-hexane layer was removed and the aqueous layer remaining was extracted with ethyl ether. The ethyl ether extract and the n-hexane layer were combined, dried and the ethyl ether and n-hexane were removed by distillation to yield 2-chloro-5-benzoyl thiophene as a yellow solid. Crystallization of the crude reaction product from aqueous ethyl alcohol yielded 71.2 grams of 2-chloro-5-benzoylthiophene in the form of a pale yellow solid melting at 53° C.–56° C. Upon purification of this product by recrystallization from aqueous ethyl alcohol and then from n-hexane, 2-chloro-5-benzoylthiophene having a melting point of 56° C.–59° C. and a boiling point of 138° C./0.5–1 mm. was obtained.

Calculated for 2-chloro-5-benzoylthiophene: C=59.32; H=3.15; S=14.38; Cl=15.95. Found: C=59.31; H=3.15; S=14.34; Cl=15.72.

2-chloro-3-nitro-5-(3'-nitrobenzoyl)-thiophene 22.3 grams of 2-chloro-5-benzoylthiophene were nitrated using a large excess of fuming HNO₃ in H₂SO₄ using the procedure described in connection with the preparation of 2-chloro-3-nitro-5-acetylthiophene. Upon crystallizing the reaction product from ethyl alcohol 9.5 grams of 2-chloro-3-nitro-5-(3'-nitrobenzoyl)-thiophene were obtained in the form of buff needles melting at 108° C.–110° C.

Calculated for 2-chloro-3-nitro-5-(3'-nitrobenzoyl)-thiophene: C=42.16; H=1.60; N=8.95; S=10.22; Cl=11.50. Found: C=42.18; H=1.69; N=8.60; S=9.18; Cl=10.93.

2-amino-3-nitro-5-(3'-nitrobenzoyl)-thiophene

A solution of 6.3 grams of 2-chloro-3-nitro-5-(3'-nitrobenzoyl)-thiophene obtained as described above in 350 cc. of methyl alcohol and 25 cc. of NH₄OH was refluxed for 1 hour. The reaction mixture thus obtained was cooled and then filtered to obtain 5.2 grams of crude 2 - amino - 3 - nitro - 5 - (3' - nitrobenzoyl) - thiophene. Upon crystallization from acetic acid 3.7 grams of purified reaction product having a melting point of 227° C.–229° C. were obtained.

2-chloro-5-(2'-chlorobenzoyl)-thiophene 1 gram mole of 2-chlorothiophene was reacted with 1 gram mole of o-chlorobenzoyl chloride in accordance with the general procedure described in connection with the preparation of 2-chloro-5-benzoylthiophene. The 2-chloro-5-(2'-chlorobenzoyl)-thiophene reaction product boiled at 147° C./0.6 mm. and was obtained in a 77% yield.

2-chloro-3-nitro-5-(5'-nitro-2'-chlorobenzoyl)-thiophene

This compound was prepared by nitrating the 2-chloro-5-(2'-chlorobenzoyl)-thiophene obtained as described above with fuming HNO₃ in H₂SO₄ in accordance with the procedure described in connection with the preparation of 2-chloro-3-nitro-5-(3'-nitrobenzoyl)-thiophene. The 2 - chloro - 3 - nitro - 5 - (5' - nitro - 2' - chlorobenzoyl) - thiophene thus obtained melted at 144° C.–147° C. The yield was about 50%.

2-amino-3-nitro-5-(5'-nitro-2'-chlorobenzoyl)-thiophene

This compound was prepared by heating 2-chloro-3-nitro - 5 - (5' - nitro - 2' - chlorobenzoyl) - thiophene with NH₄OH in methyl alcohol in accordance with the procedure described in connection with the preparation of 2-amino-3-nitro-5-(3'-nitrobenzoyl)-thiophene. The product obtained melter at 234° C.–237° C.

2-chloro-5-(2'-methoxybenzoyl)-thiophene 1 gram mole of 2-chlorothiophene was reacted with 1 gram mole of o-methoxybenzoyl chloride in accordance with the general procedure described in connection with the preparation of 2-chloro-5-benzoylthiophene. 2-chloro-5-(2'-methoxybenzoyl)-thiophene boiling at 150° C./0.5 mm. was obtained in about a 55% yield.

2-chloro-3-nitro-5-(5'-nitro-2'-methoxybenzoyl)-thiophene

This compound was prepared by nitrating 2-chloro-5-(2'-methoxybenzoyl)-thiophene with an excess of fuming HNO₃ in H₂SO₄ in accordance with the general procedure described in connection with the preparation of 2-chloro-3-nitro-5-(3'-nitrozenzoyl)-thiophene. A fair yield of 2-chloro - 3 - nitro - 5 - (5' - nitro - 2' - methoxybenzoyl) - thiophene melting at 159° C.–161° C. was obtained,

2-amino-3-nitro-5-(5'-nitro-2'-methoxybenzoyl)-thiophene

This compound was prepared by heating 2-chloro-3-nitro - 5 - (5' - nitro - 2' - methoxybenzoyl) - thiophene with NH₄OH in methyl alcohol in accordance with the procedure described in connection with the preparation of 2-amino-3-nitro-5-(3'-nitrobenzoyl)-thiophene. The 2-amino - 3 - nitro - 5 - (5' - nitro - 2' - methoxybenzoyl) - thiophene obtained has a melting point of 235° C.–236° C.

2-chloro-5-(2',4'-dichlorobenzoyl)-thiophene

This compound was prepared by reacting equal mole proportions of 2-chlorothiophene and 2,4-dichlorobenzoyl chloride in accordance with the general procedure described in connection with the preparation of 2-chloro-5-benzoylthiophene. 2-chloro-5-(2',4'-dichlorobenzoyl)-thiophene boiling at 163° C./0.4 mm. and melting at 45° C.–48° C. was obtained.

2-chloro-3-nitro-5-(2',4'-dichloro-5'-nitrobenzoyl)-thiophene

This compound was prepared by nitrating 2-chloro-5-(2',4'-dichlorobenzoyl)-thiophene with an excess of fuming HNO₃ in H₂SO₄ in accordance with the general procedure described in connection with the preparation of 2-chloro-3-nitro-5-(3'-nitrobenzoyl)-thiophene. An 89.5% yield of 2-chloro-3-nitro-5-(2-',4'-dichloro-5'-nitrobenzoyl)-thiophene melting at 166° C.–168° C. was obtained. Nitration using one equivalent of fuming HNO₃ in H₂SO₄ yielded a mixed product, apparently starting material and 2 - chloro - 3 - nitro - 5 - (2',4' - dichloro - 5' - nitrobenzoyl)-thiophene.

2-amino-3-nitro-5-(2',4'-dichloro-5'-nitrobenzoyl)-thiophene

This compound was prepared by heating 2-chloro-3-nitro - 5 - (2',4' - dichloro - 5' - nitrobenzoyl) - thiophene with NH₄OH in methyl alcohol in accordance with the procedure described in connection with the preparation of 2-amino-3-nitro-5-(3'-nitrobenzoyl)-thiophene. The 2 - amino - 3 - nitro - 5 - (2',4' - dichloro - 5' - nitrobenzoyl)-thiophene obtained has a melting point of 205° C.

2-chloro-5-(3',4'-dichlorobenzoyl)-thiophene

This compound was prepared by reacting equal mole proportions of 2-chlorothiophene and 3,4-dichlorobenzoyl chloride in accordance with the general procedure described in connection with the preparation of 2-chloro-5-benzoylthiophene. A 53% yield of 2-chloro-5-(3',4'-dichlorobenzoyl)-thiophene was obtained. Upon recrystallization from ethyl alcohol it melted at 115° C.–117° C.

2-chloro-3-nitro-5-(3',4'-dichlorobenzoyl)-thiophene

Nitration of 2-chloro-5-(3',4'-dichlorobenzoyl)-thiophene with a large excess of fuming HNO₃ in H₂SO₄ gave 2-chloro-3-nitro-5-(3',4'-dichlorobenzoyl)-thiophene. The position of the chlorine atoms prevented the benzoyl nucleus from being nitrated. The product was obtained in quantitative crude yield. Crystallization from ethyl alcohol-benzene gave a 59.5% yield of purified product in the form of pale cream needles melting at 173° C.–175° C.

2-amino-3-nitro-5-(3',4'-dichlorobenzoyl)-thiophene

This compound was prepared by heating 2-chloro-3-nitro-5-(3',4'-dichlorobenzoyl)-thiophene with NH₄OH in methyl alcohol in accordance with the procedure described in connection with the preparation of 2-amino-3-nitro-5-(3'-nitrobenzoyl)-thiophene. The 2-amino-3-nitro-5-(3',4'-dichlorobenzoyl)-thiophene after crystallization from acetic acid melted at 255° C.–257° C. with decomposition. A 65% yield was obtained.

Our work indicates that with the exception noted, nitration of 2-chloro-5-benzoylthiophene compounds yields only dinitrated compounds containing a nitro group in both the thiophene and benzoyl nucleus. Thus, nitration of 2-chloro-5-benzoylthiophene yielded only 2-chloro-3-nitro-5-(3'-nitrobenzoyl)-thiophene. This is true even when only one equivalent of HNO₃ was used, the products in this case being 2-chloro-3-nitro-5-(3'-nitrobenzoyl)-thiophene mixed with unchanged 2 - chloro - 5 - benzoylthiophene. However, as noted under the preparation of 2 - chloro - 3 - nitro - 5 - (3',4' - dichlorobenzoyl)- thiophene where the benzoyl nucleus contains substituents which prevent it from being nitrated mono nitrated 2-chloro-5-benzoylthiophene compounds can be prepared. Failure to nitrate the benzoyl nucleus when it contains chlorine atoms in both the 3 and 4-positions is probably due to the steric hindrance of the two chlorine atoms.

As previously indicated the azo compounds of our invention are dyes for fibers prepared from graft polymers obtained by graft polymerizing acrylonitrile alone or together with one or more other monoethylenic monomers with a preformed polymer. The preformed polymer can be a homopolymer (a polymer prepared by polymerization of a single monomer) or it can be an interpolymer such as a copolymer (a polymer prepared by the simultaneous polymerization in a single reaction mixture of two monomers) or a terpolymer (a polymer prepared by the simultaneous polymerization in a single reaction mixture of three monomers), or the like, and the graft polymers for which the dyes are particularly useful are those containing at least 5% by weight of combined acrylonitrile grafted to the preformed polymer molecule.

The graft polymers which can be dyed using our azo compounds are thus polymers having directed placement of the polymerized monomeric units in the graft polymer molecule as distinguished from the random distribution obtained in interpolymers which are prepared by simultaneous polymerization of all of the monomeric materials in the polymer. The preformed polymer can be either a homopolymer of any of the well-known polymerizable monomers containing a single —CH=C< group and desirably a CH₂=C< group, or an interpolymer of two or more of such monomers; and the grafting can be effected with the preformed homopolymer or interpolymer in the polymerization mixture in which it was formed (i. e. a live polymer) or with the preformed polymer isolated from the polymerization mixture in which it was formed (i. e. a dead polymer).

The preformed polymer desirably is a homopolymer of a vinyl pyridine, an acrylamide, a maleamide, a fumaramide, an acrylate, a methacrylamide, a methacrylate, an itaconamide, a citraconamide, a fumaramate, an itaconamate, a citraconamate, a maleamate, or a vinyl ester; or an interpolymer of two or more of such monomers with each other or of at least one of such monomers with one or more different monoethylenic monomers characterized by a —CH=C< group such as styrene, acrylonitrile, substituted styrenes, vinyl or vinylidene chlorides, vinyl esters, dialkyl maleates, alkenyl ketones, dialkyl fumarates, acrylic acid, methacrylic acid, substituted acrylonitriles, fumaronitrile, ethylene and the like.

The graft polymerization is effected by polymerizing acrylonitrile or a mixture of acrylonitrile with any other monoethylenic monomer, including any of the monomers enumerated hereinabove, with the preformed live or dead homopolymer or interpolymer whereby the acrylonitrile alone or together with another grafting monomer is combined with the preformed polymer molecule to give a graft polymer containing from 5 to 95% by weight of combined acrylonitrile.

The new azo compounds of our invention are of particular utility for dyeing fibers prepared from a graft polymer obtained by graft polymerizing acrylonitrile and an acrylamide or methacrylamide with a preformed copolymer of acrylonitrile and the same or different acrylamide or methacrylamide.

U. S. Patent 2,620,324, issued December 2, 1952, U. S. Patent 2,649,434, issued August 18, 1953, and U. S. Patent 2,657,191, issued October 27, 1953, disclose other typical graft polymers that can be dyed with the new azo compounds of our invention.

The new azo compounds of our invention may be directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water. While an aqueous suspension has been referred to it will be understood that some of the dye goes into solution, and this is particularly so in the case of the sulfato dye compounds. Thus, the dye bath will contain dye in solution as well as in suspension.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

Compounds having the Formula II wherein $R_1$ and $R_2$ each represents a hydrogen atom can be applied to a textile material such as cellulose acetate, diazotized thereon and coupled with a coupling component such as 2-hydroxy-3-carboxynaphthalene or β-naphthol, for example. This method of dyeing is known as developed dyeing and can be carried out using procedures well known to those skilled in the art.

The manner of using the azo compounds as dyes is illustrated hereinafter with reference to the dyeing of fibers of graft polymers.

16 milligrams of dye are ground with an aqueous solution of sodium lignin sulfonate until well dispersed or alternately the dye can be dissolved in 5 cc. of hot Cellosolve. The dispersion or solution, as the case may be, is then poured into 150 cc. of water to which a small amount of a surface-active agent such as Igepon T ($C_{17}H_{33}.CO.N(CH_3).C_2H_4SO_3Na$) Nekal BX (sodium alkylnaphthalenesulfonate) or Orvus (sodium lauryl sulfate-type) has been added. The dye bath is then brought to the desired temperature and 5 grams of well wet-out fibers of the graft polymer are added thereto. Dyeing is continued until the proper shade is reached. From time to time throughout the dyeing operation, the material is worked to promote even dyeing.

Many of the graft polymer fibers dye at relatively low temperature (80° C.–90° C.) but in some cases, it is necessary to dye at the boil for extended periods of time. As well understood in the dyeing art, widely varying amounts of dye can be used in the dyeing operation depending upon the shade desired.

We claim:
1. The azo compounds having the formula:

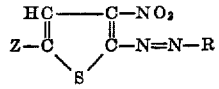

wherein Z represents a member selected from the group consisting of an acetyl group, an n-propionyl group, an isobutyryl group, an n-butyryl group, a trifluoroacetyl group and a benzoyl group and R represents a member selected from the group consisting of an aniline coupling component devoid of a sulfonic acid group, a tetrahydro-quinoline coupling component devoid of a sulfonic acid group and a benzomorpholine coupling component devoid of a sulfonic acid group.

2. The azo compounds having the formula:

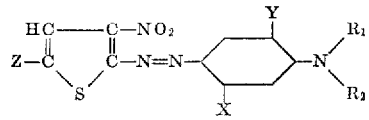

wherein $R_1$ represents a member selected from the group consisting of a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a β-acetoxyethyl group, a carbomethoxymethyl group, a carboethoxymethyl group, a β-carbomethoxyethyl group and a β-carboethoxyethyl group, $R_2$ represents a member selected from the group consisting of an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a β-acetoxyethyl group, a carbomethoxymethyl group, a carboethoxymethyl group, a β-carbomethoxyethyl group, a β-carboethoxyethyl group, a β,β-difluoroethyl group, a β,β-difluoro-n-propyl group, a γ,γ-difluoropropyl group, a γ,γ-difluoro-n-butyl group, a δ,δ-difluoro-n-amyl group, a β,β,β-trifluoroethyl group, a γ,γ,γ-trifluoropropyl group and a δ,δ,δ-trifluorobutyl group, X represents a member selected from the group consisting of a hydrogen atom, a bromine atom, a chlorine atom, a methyl group, an ethyl group, a methoxy group, an ethoxy group, an acetylamino group, an n-propionylamino group and an n-butyrylamino group, Y represents a member selected from the group consisting of a hydrogen atom, a methyl group, an ethyl group, a methoxy group and an ethoxy group and Z represents a member selected from the group consisting of an acetyl group, an n-propionyl group, an isobutyryl group, an n-butyryl group, a trifluoroacetyl group and a benzoyl group.

3. The azo compounds having the formula:

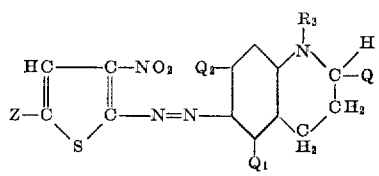

wherein $R_3$ represents a hydroxyalkyl group having 2 to 4, inclusive, carbon atoms, Q represents a member selected from the group consisting of a hydrogen atom and a methyl group, $Q_1$ and $Q_2$ each represents a member selected from the group consisting of a hydrogen atom, a methyl group, a methoxy group, a chlorine atom, a bromine atom, a fluorine atom, an acetylamino group, a propionylamino group and a butyrylamino group and Z represents a member selected from the group consisting of an acetyl group, an n-propionyl group, an isobutyryl group, an n-butyryl group, a trifluoroacetyl group and a benzoyl group.

4. The azo compounds having the formula:

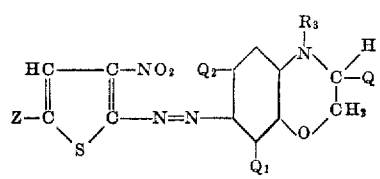

wherein $R_3$ represents a hydroxyalkyl group having 2 to 4, inclusive, carbon atoms, Q represents a member selected from the group consisting of a hydrogen atom and a methyl group, $Q_1$ and $Q_2$ each represents a member selected from the group consisting of a hydrogen atom, a methyl group, a methoxy group, a chlorine atom, a bromine atom, a fluorine atom, an acetylamino group, a propionylamino group and a butyrylamino group and Z represents a member selected from the group consisting of an acetyl group, an n-propionyl group, an isobutyryl group, an n-butyryl group, a trifluoroacetyl group and a benzoyl group.

5. The azo compounds having the formula:

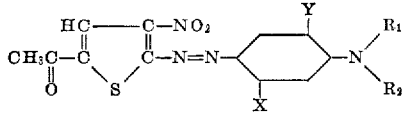

wherein $R_1$ represents a member selected from the group consisting of a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a $\beta$-acetoxyethyl group, a carbomethoxymethyl group, a carboethoxymethyl group, a $\beta$-carbomethoxyethyl group and a $\beta$-carboethoxyethyl group, $R_2$ represents a member selected from the group consisting of an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a $\beta$-acetoxyethyl group, a carbomethoxymethyl group, a carbethoxyethyl group, a $\beta$-carbomethoxyethyl group, a $\beta$-carboethoxyethyl group, a $\beta,\beta$-difluoroethyl group, a $\beta,\beta$-difluoro-n-propyl group, a $\gamma,\gamma$-difluoropropyl group, a $\gamma,\gamma$-difluoro-n-butyl group, a $\delta,\delta$-difluoro-n-amyl group, a $\beta,\beta,\beta$-trifluoroethyl group, a $\gamma,\gamma,\gamma$-trifluoropropyl group and a $\delta,\delta,\delta$-trifluorobutyl group. X represents a member selected from the group consisting of a hydrogen atom, a bromine atom, a chlorine atom, a methyl group, an ethyl group, a methoxy group, an ethoxy group, an acetylamino group, an n-propionylamino group and an n-butyrylamino group and Y represents a member selected from the group consisting of a hydrogen atom, a methyl group an ethyl group, a methoxy group and an ethoxy group.

6. The azo compounds having the formula:

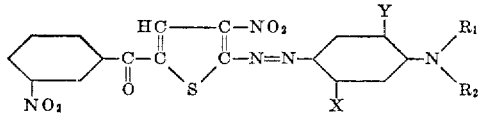

wherein $R_1$ represents a member selected from the group consisting of a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a $\beta$-acetoxyethyl group, a carbomethoxymethyl group, a carboethoxymethyl group, a $\beta$-carbomethoxyethyl group, a $\beta$-carboethoxyethyl group, R_2 represents a member selected from the group consisting of an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, a $\beta$-acetoxyethyl group, a carbomethoxymethyl group, a carboethoxyethyl group, a $\beta$-carbomethoxyethyl group, a $\beta$-carboethyl group a $\beta,\beta$-difluoroethyl group, a $\beta,\beta$-difluoro-n-propyl group, a $\gamma,\gamma$-difluoropropyl group, a $\gamma,\gamma$-difluoro-n-butyl group, a $\delta,\delta$-difluoro-n-amyl group, a $\beta,\beta,\beta$-trifluoroethyl group, a $\gamma,\gamma,\gamma$-trifluoropropyl group and a $\delta,\delta,\delta$-trifluorobutyl group, X represents a member selected from the group consisting of a hydrogen atom, a bromine atom, a chlorine atom, a methyl group, an ethyl group, a methoxy group, an ethoxy group, an acetylamino group, an n-propionylamino group and a n-butyrylamino group and Y represents a member selected from the group consisting of a hydrogen atom, a methyl group, an ethyl group, a methoxy group and an ethoxy group.

7. The azo compounds having the formula:

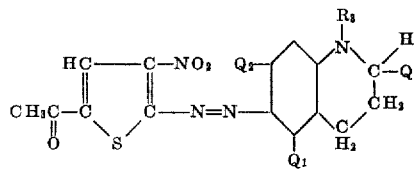

wherein $R_3$ represents a hydroxyalkyl group having 2 to 4, inclusive, carbon atoms, Q represents a member selected from the group consisting of a hydrogen atom and a methyl group, and $Q_1$ and $Q_2$ each represents a member selected from the group consisting of a hydrogen atom, a methyl group, a methoxy group, a chlorine atom, a bromine atom, a fluorine atom, an acetylamino group, a propionylamino group and a butyrylamino group.

8. The azo compounds having the formula:

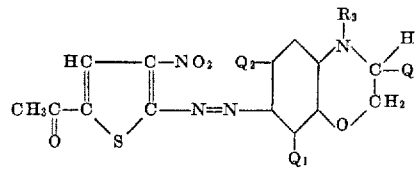

wherein $R_3$ represents a hydroxyalkyl group having 2 to 4, inclusive, carbon atoms, Q represents a member selected from the group consisting of a hydrogen atom and a methyl group, and $Q_1$ and $Q_2$ each represents a member selected from the group consisting of a hydrogen atom, a methyl group, a methoxy group, a chlorine atom, a bromine atom, a fluorine atom, an acetylamino group, a propionylamino group and a butyrylamino group.

9. The azo compounds having the formula:

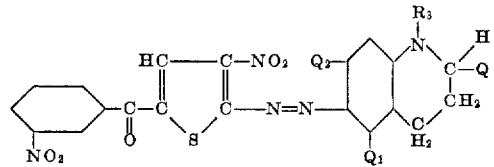

wherein $R_3$ represents a hydroxyalkyl group having 2 to 4, inclusive, carbon atoms, Q represents a member selected from the group consisting of a hydrogen atom and a methyl group, and $Q_1$ and $Q_2$ each represents a member selected from the group consisting of a hydrogen atom, a methyl group, a methoxy group, a chlorine atom, a bromine atom, a fluorine atom, an acetylamino group, a propionylamino group and a butyrylamino group.

10. The azo compounds having the formula:

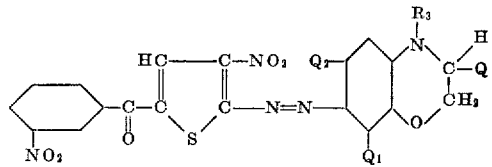

wherein $R_3$ represents a hydroxyalkyl group having 2 to 4, inclusive, carbon atoms, Q represents a member selected from the group consisting of a hydrogen atom and a methyl group, and $Q_1$ and $Q_2$ each represents a member selected from the group consisting of a hydrogen atom, a methyl group, a methoxy group, a chlorine atom, a bromine atom, a fluorine atom, an acetylamino group, a propionylamino group and a butyrylamino group.

11. The azo compound having the formula:

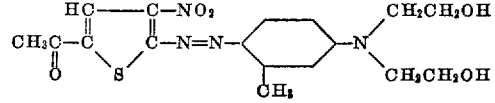

12. The azo compound having the formula:
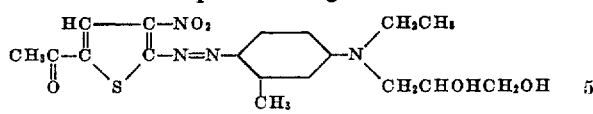
13. The azo compound having the formula:
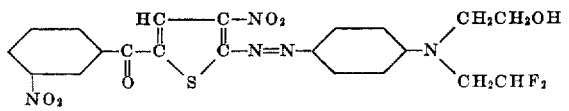
14. The azo compound having the formula:
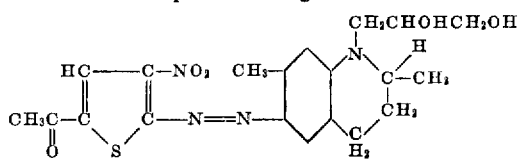
15. The azo compound having the formula:
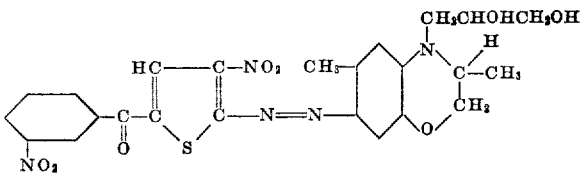
References Cited in the file of this patent
UNITED STATES PATENTS
| | | |
|---|---|---|
| 2,625,542 | Long | Jan. 13, 1953 |
| 2,680,117 | Hermann | June 1, 1954 |

UNITED STATES PATENT OFFICE

CERTIFICATE OF CORRECTION

Patent No. 2,805,218                              September 3, 1957

Edmund B. Towne et al.

It is hereby certified that error appears in the printed specification of the above numbered patent requiring correction and that the said Letters Patent should read as corrected below.

Column 3, line 65, for "hydropropylbenzomorpholine" read --hydroxypropylbenzomorpholine--; column 4, line 45, for "0 C.-5° C." read --0° C.-5° C.--; line 53, for "type" read --dye--; column 14, line 58, for "melter" read --melted--; column 19, line 63, for "β-carboethyl" read --β-carboethoxyethyl--.

Signed and sealed this 3rd day of December 1957.

(SEAL)
Attest:

KARL H. AXLINE                                      ROBERT C. WATSON
Attesting Officer                                     Commissioner of Patents